May 14, 1940.  L. E. FRISBIE  2,200,791
TRACTOR WHEEL LUG
Filed March 16, 1939
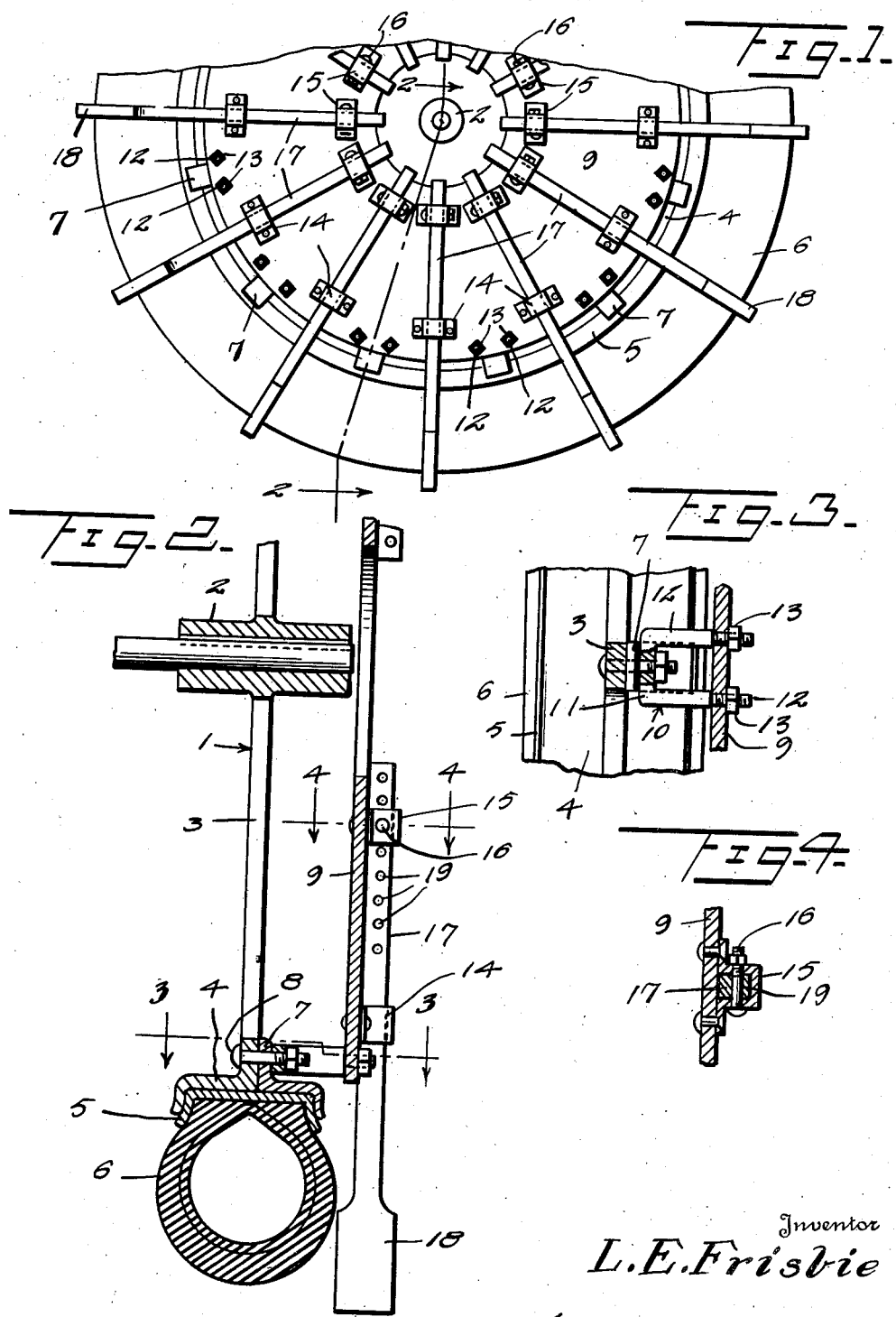
Inventor
L. E. Frisbie
By Watson E. Coleman
Attorney Patented May 14, 1940

2,200,791

UNITED STATES PATENT OFFICE 2,200,791

TRACTOR WHEEL LUG

Lewis E. Frisbie, Iuka, Kans.

Application March 16, 1939, Serial No. 262,296

1 Claim. (Cl. 301—38)

This invention relates to traction increasing devices for motor vehicles and pertains particularly to the use of such devices upon tractors.

The present invention has for its primary object to provide a traction increasing device designed for application to the drive wheels of tractors, which is so designed that it may be readily mounted upon the tractor wheel without the necessity of altering any of the wheel construction and may be easily and quickly adjusted after being mounted upon the wheel, whereby the desired amount of traction for the wheel may be gained by the extent to which the traction lugs of the device are permitted to penetrate the ground.

Another object of the invention is to provide a traction increasing device for tractor drive wheels which comprises a series of lug members supported upon a carrier body, which is designed for application to the side of the tractor wheel, the lugs being so supported upon the supporting body that they may be given any desired amount of radial extension with respect to the adjacent wheel tire, for engagement with the ground.

Another object of the invention is to provide a traction increasing device employing a series of lug members, in which each lug member is connected by a shank with guides upon a supporting disk which is secured to the wheel and such shanks are adjustably connected to the supporting disk in such a manner that they may be given a series of radial adjustments whereby a deep penetration of the lug into the earth may be obtained or the lug may be held in such position with respect to the vehicle wheel tire that it will be free of contact with the earth.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claim.

In the drawing:

Fig. 1 is a view in side elevation of a wheel showing the attached lugs constructed in accordance with the present invention.

Fig. 2 is a sectional view on the line 2—2 of Fig. 1.

Fig. 3 is a section on the line 3—3 of Fig. 2.

Fig. 4 is a section on the line 4—4 of Fig. 2.

Referring now more particularly to the drawing, the numeral 1 generally designates a tractor wheel, which comprises the hub portion 2, the spokes 3 and felly 4 on which is mounted the rim 5 for the tire 6. The rim 5 is secured in place on the felly by a series of lugs 7, each of which is held in place by a bolt 8 which passes through the felly and through the lug and draws the latter up into position where it will engage the wheel rim and secure the latter against movement.

In carrying out the present invention there is provided a flat annulus 9 which is designed to be placed against the outer side of the wheel concentrically therewith. This annulus is maintained in position at the outer side of the wheel by a series of U-bolts 10, each of which has the yoke portion 11 provided with a bolt opening to receive the wheel lug securing bolt 8. This bolt 8 serves to maintain the U-bolt 10 in position against the outer side of the lug 7 in the manner illustrated, with the legs 12 of the U-bolt directed outwardly, and these legs pass through suitable apertures provided in the annulus 9 and receive upon their outer ends and at the outer side of the annulus, the nuts 13 by means of which the annulus is held in place upon the legs of the U-bolts. Thus it will be seen that each of the lug bolts 8 is employed to hold a U-bolt securely in position against the outer side of the lug as well as to secure the lug in its proper position and the annulus 9 overlies the outer ends of the bolts 8.

Secured to the outer face of the annulus 9 are radially spaced pairs of guides, the outer guide of each pair being indicated by the numeral 14 while the inner one is indicated by the numeral 15. The inner guides 15 are provided with transverse apertures to receive bolts 16.

Extending through each pair of guides 14—15 and therefore extending radially of the annulus and the wheel is the elongated shank portion 17 of a traction lug 18, the traction lug being disposed at the outer end of the shank or at the end adjacent the wheel tire 6 and, as shown, each lug is in the form of a relatively wide blade which is disposed in a plane extending transversely of the tire.

Each of the lug shanks is provided with a series of transverse apertures 19 through one of which apertures the securing bolt 16 of the inner guide 15 passes. By the provision of the apertures 19 and the securing bolt or pin 16, the lugs may be radially adjusted on the wheel, as will be readily apparent.

From the foregoing, it will be readily apparent that the traction increasing device herein described is of relatively simple design and may be readily attached to or removed from a tractor wheel and when attached, may have the lugs 18 easily and quickly adjusted either to be retained in a position where they will be free from contact with the ground or to a position where they will penetrate the ground so as to prevent slipping of the tractor wheel, thereby giving the desired traction thereto, the extent of penetration of the lug being limited only by the length of its shank and the number of adjustment apertures which the shank contains.

What is claimed is:

In a traction increasing device for a vehicle wheel having rim, bolts carried by said rim and extending axially of the wheel, a flat annulus disposed at the outer side of the wheel and concentrically therewith, a plurality of U-bolts each having two parallel legs and a straight right angularly extending yoke portion connecting the legs, said U-bolts having the legs thereof reduced at their outer ends and extended through said annulus and having the yoke portion thereof disposed against an adjacent part of the wheel, each of said U-bolt yokes having an opening to receive one of said bolts by which the U-bolt is secured with its legs extending axially of the wheel and the said reduced ends of the legs of the U-bolts providing shoulders against which the annulus bears and carrying securing nuts engaging the outer face of the annulus, a plurality of ground engaging lugs each having an elongated shank portion integral therewith, said lug shanks being disposed radially across the outer face of the annulus, a plurality of guides disposed upon and directed radially of the outer face of the annulus, each guide having a lug shank extending therethrough, each of said lug shanks having a series of transverse apertures, and means carried by each of the said guides for selective engagement in the apertures of the adjacent lug shank to secure the shank and lug in adjusted position on the annulus.

LEWIS E. FRISBIE.